(12) United States Patent
Sanda et al.

(10) Patent No.: US 10,768,127 B2
(45) Date of Patent: Sep. 8, 2020

(54) THERMAL CONDUCTIVITY MEASUREMENT APPARATUS AND THERMAL CONDUCTIVITY MEASUREMENT METHOD

(71) Applicant: MITSUBISHI ELECTRIC CORPORATION, Chiyoda-ku, Tokyo (JP)

(72) Inventors: Yasuyuki Sanda, Tokyo (JP); Dai Nakajima, Tokyo (JP); Haruna Tada, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 212 days.

(21) Appl. No.: 15/765,751

(22) PCT Filed: Oct. 21, 2016

(86) PCT No.: PCT/JP2016/081260
§ 371 (c)(1),
(2) Date: Apr. 4, 2018

(87) PCT Pub. No.: WO2017/073479
PCT Pub. Date: May 4, 2017

(65) Prior Publication Data
US 2018/0299391 A1    Oct. 18, 2018

(30) Foreign Application Priority Data
Oct. 30, 2015  (JP) .................................. 2015-214380

(51) Int. Cl.
*G01N 25/18*    (2006.01)
*G01K 7/02*    (2006.01)
(Continued)

(52) U.S. Cl.
CPC .................................... *G01N 25/18* (2013.01)

(58) Field of Classification Search
USPC ................... 374/44, 141, 110, 166, 208, 179
See application file for complete search history.

(56) References Cited

U.S. PATENT DOCUMENTS 3,263,485 A * 8/1966 Mahmoodi ............ G01N 25/18
374/44
3,521,476 A * 7/1970 Day ....................... G01N 25/18
374/44

(Continued)

FOREIGN PATENT DOCUMENTS

EP    2 418 477 A1    2/2012
JP    1-201147 A    8/1989

(Continued)

OTHER PUBLICATIONS

International Search Report (PCT/ISA/210) dated Jan. 24, 2017, by the Japanese Patent Office as the International Searching Authority for International Application No. PCT/JP2016/081260.

(Continued)

*Primary Examiner* — Mirellys Jagan
(74) *Attorney, Agent, or Firm* — Buchanan Ingersoll & Rooney PC (57) ABSTRACT

This thermal conductivity measurement apparatus has a first holding member which has an end face that contacts an object to be measured and a distal end face; a second holding member which has an end face that contacts an object to be measured and a distal end face; a heating member which has an end face which abuts the distal end face of the first holding member and a distal end face, and which heats the first holding member; a cooling member which has an end face that abuts the distal end face of the second holding member and a distal end face, and which cools the second holding member; a plurality of temperature sensors provided (Continued)

at the first and the second holding members; and a pressing force application mechanism that applies pressing force to the first holding member, the second holding member, and the object to be measured.

13 Claims, 8 Drawing Sheets

(51) Int. Cl.
*G01K 1/00* (2006.01)
*G01K 13/00* (2006.01)

(56) References Cited

U.S. PATENT DOCUMENTS

| | | | | |
|---|---|---|---|---|
| 3,733,887 A * | 5/1973 | Stanley | | G01N 25/18 374/44 |
| 4,630,938 A * | 12/1986 | Piorkowska-Palczewska | | G01N 25/18 374/29 |
| 5,667,301 A * | 9/1997 | Jurkowski | | G01N 25/18 374/43 |
| 5,940,784 A * | 8/1999 | El-Husayni | | G01N 25/18 374/43 |
| 6,116,777 A * | 9/2000 | Pause | | G01N 33/36 374/43 |
| 6,142,662 A * | 11/2000 | Narh | | G01N 25/18 374/29 |
| 6,331,075 B1 * | 12/2001 | Amer | | G01N 25/18 374/44 |
| 6,742,926 B1 * | 6/2004 | Fesmire | | G01N 25/18 374/34 |
| 6,896,405 B2 * | 5/2005 | Osone | | G01N 25/18 374/43 |
| 7,445,379 B2 * | 11/2008 | Chang | | G01N 25/20 374/142 |
| 7,517,140 B2 * | 4/2009 | Cervantes | | G01N 25/18 374/7 |
| 2003/0072349 A1 | 4/2003 | Osone et al. | | |
| 2005/0058178 A1 | 3/2005 | Shih | | |
| 2006/0045165 A1 * | 3/2006 | Chan | | G01N 3/60 374/43 |
| 2019/0369038 A1 * | 12/2019 | Tada | | G01N 25/18 |

FOREIGN PATENT DOCUMENTS

| | | | |
|---|---|---|---|
| JP | 2003-152028 A | 5/2003 | |
| JP | 2006-145446 A | 6/2006 | |
| JP | 3 858 660 B2 | 12/2006 | |
| JP | 2007-178218 A | 7/2007 | |
| JP | 2008-309729 A | 12/2008 | |
| JP | 2009-233727 A | 10/2009 | |
| JP | 2011-102768 A | 5/2011 | |
| JP | 2012-032196 A | 2/2012 | |
| JP | 5 379 760 B2 | 12/2013 | |
| JP | 5 509 195 B2 | 6/2014 | |
| WO | WO 2010/103784 A1 | 9/2010 | |

OTHER PUBLICATIONS

Written Opinion (PCT/ISA/237) dated Jan. 24, 2017, by the Japanese Patent Office as the International Searching Authority for International Application No. PCT/JP2016/081260.

* cited by examiner

THERMAL CONDUCTIVITY MEASUREMENT APPARATUS AND THERMAL CONDUCTIVITY MEASUREMENT METHOD

TECHNICAL FIELD

The present invention relates to a thermal conductivity measurement apparatus and a thermal conductivity measurement method for measuring thermal conductivity of a material.

BACKGROUND ART

Various apparatuses are conventionally known as an apparatus measuring a thermophysical property value (particularly thermal conductivity) of an object to be measured such as a resin material and a metallic material and a contact thermal resistance between members of a resin material or a metallic material by a steady state method (Patent Documents 1 to 5).

A thermophysical property measurement apparatus using a steady state method employs a configuration in which an object to be measured is sandwiched between a heating-side holding member connected to a heating part and a cooling-side holding member connected to a cooling part. The heating-side holding member and the cooling-side holding member are configured such that temperature can be measured at multiple positions, and a measured temperature gradient is used for obtaining a thermophysical property value (such as thermal conductivity) of an object to be measured and a contact thermal resistance between the members.

PRIOR ART DOCUMENTS

Patent Documents

Patent Document 1: Japanese Patent No. 5379760
Patent Document 2: Japanese Patent No. 3858660
Patent Document 3: Japanese Laid-Open Patent Publication No. 2008-309729
Patent Document 4: Japanese Laid-Open Patent Publication No. 2011-102768
Patent Document 5: Japanese Patent No. 5509195

SUMMARY OF THE INVENTION

Problem to be Solved by the Invention

A thermophysical property (thermal conductivity, contact thermal resistance, etc.) measurement apparatus using a steady state method maintains a state in which an object to be measured is sandwiched between a heating-side holding member provided with multiple temperature measurement mechanisms and a cooling-side holding member provided with multiple temperature measuring mechanisms and allows heat to pass from the heating-side holding member connected to a heat source through the object to be measured to the cooling-side holding member connected to a cooling source in one direction so as to calculate a thermophysical property (such as thermal conductivity) of the object to be measured from temperature measured at temperature measurement points disposed in both holding members. When the contact thermal resistance is calculated between the members, the heating-side holding member and the cooling-side holding member are brought into contact with each other while a pressing force is applied without sandwiching the object to be measured, and the contact thermal resistance is calculated from the temperature measured at the temperature measurement points disposed in both holding members.

To ensure the measurement accuracy of the thermophysical property value of the object to be measured, a flow of heat passing through the heating-side holding member, the object to be measured, and the cooling-side holding member in this order must be prevented from being spatially biased.

In the measurement apparatus described above, by disposing the object to be measured in a normal state between the heating-side holding member and the cooling-side holding member, i.e., by disposing the object such that the heating-side holding member, the object to be measured, and the cooling-side holding member are vertically arranged along a heat passage direction (vertical direction), the heat can pass through the heating-side holding member, the object to be measured, and the cooling-side holding member without bias of the flow of heat.

On the other hand, if the object to be measured is disposed in a non-normal disposition state between the heating-side holding member and the cooling-side holding member, i.e., if the heating-side holding member, the object to be measured, and the cooling-side holding member are tilted from the heat passage direction (vertical direction), the flow of passing heat is spatially biased and, as a result, the thermophysical property value of the object to be measured cannot precisely be measured.

To detect an abnormality of disposition of the heating-side holding member, the object to be measured, and the cooling-side holding member, for example, Patent Document 1 discloses a system that is provided with a mechanism capable of measuring a temperature variation in an in-plane direction of the holding members in a direction parallel to surfaces of the heating-side holding member and the cooling-side holding member coming into contact with the object to be measured and that detects the temperature variation in the in-plane direction equal to or greater than a certain value as an abnormality of disposition.

However, adding the system detecting an abnormality of disposition of the heating-side holding member, the object to be measured, and the cooling-side holding member makes the apparatus more complicated and increases costs. Additionally, since an operation must be performed with sufficient attention given to a disposition state and an abnormality cannot be detected unless measurement is started, the measurement takes time depending on the disposition state, resulting in deterioration in efficiency of the measurement. Another problem is that the thermophysical property value of the object to be measured cannot precisely be measured due to a set threshold value of the temperature variation in some cases.

An object of the present invention is to provide a thermal conductivity measuring apparatus capable of shortening a setting time and an adjustment time of measurement and efficient and highly accurate in measurement.

Means for Solving Problem

To achieve the objects, a thermal conductivity measurement apparatus according to the present invention is a thermal conductivity measurement apparatus comprising:

a first holding member having a contact end face coming into contact with an object to be measured and a distal end face disposed on the side opposite to the contact end face;

a second holding member having a contact end face coming into contact with the object to be measured and a distal end face disposed on the side opposite to the contact end face, the second holding member holding the object to be measured together with the first holding member;

a heating member having an abutting end face abutting on the distal end face of the first holding member and a distal end face disposed on the side opposite to the abutting end face, the heating member heating the first holding member;

a cooling member having an abutting end face abutting on the distal end face of the second holding member and a distal end face disposed on the side opposite to the abutting end face, the cooling member cooling the second holding member;

a plurality of temperature sensors disposed in the first holding member and the second holding member; and a pressing force application mechanism applying a pressing force to the first holding member, the second holding member, and the object to be measured, wherein at least one of the distal end face of the first holding member, the distal end face of the second holding member, the abutting end face of the heating member, the distal end face of the heating member, the abutting end face of the cooling member, and the distal end face of the cooling member has a convex curved shape.

Effect of the Invention

According to the present invention, at least one of the distal end face of the first holding member, the distal end face of the second holding member, the abutting end face of the heating member, the abutting end face of the cooling member, the distal end face of the heating member, and the distal end face of the cooling member has a convex curved shape, so that the temperature variation in the in-plane direction of the object to be measured can significantly be suppressed when the pressing force is applied to the object to be measured. Therefore, the setting time and the adjustment time of measurement can be shortened, and efficient and highly accurate measurement can be performed.

MODES FOR CARRYING OUT THE INVENTION

First Embodiment

Figure 1:
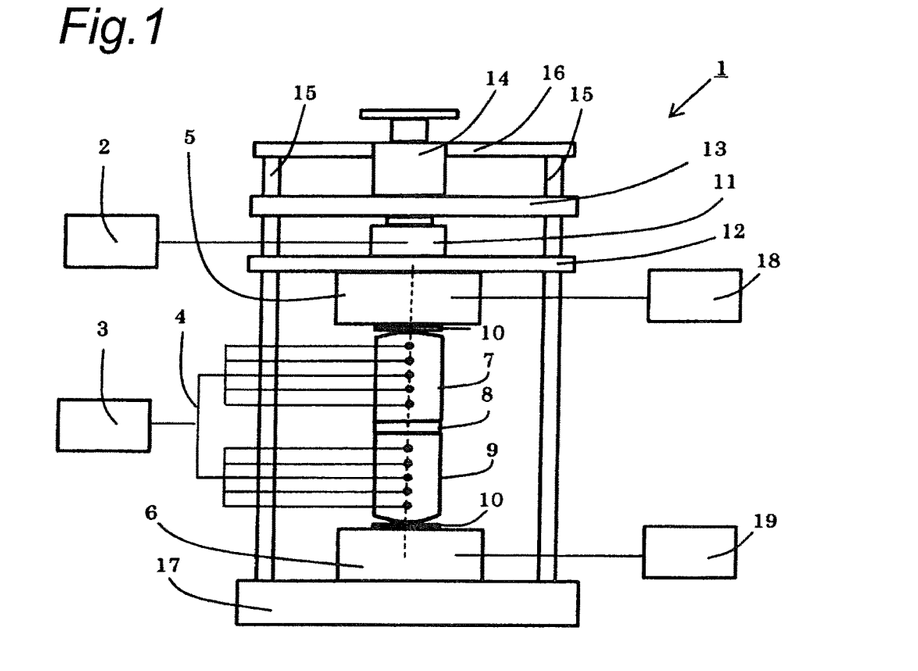
FIG. 1 is a configuration diagram of a thermal conductivity measurement apparatus according to a first embodiment of the present invention.

FIG. 1 is a configuration diagram of a thermal conductivity measurement apparatus according to a first embodiment of the present invention, generally denoted by 1. The thermal conductivity measurement apparatus 1 is made up of a heating-side holding member 7 and a cooling-side holding member 9 sandwiching an object to be measured 8, a heating block unit 5, a cooling block unit 6, a pressing force adjustment screw 14, etc.

The heating-side holding member 7 and the cooling-side holding member 9 are configured to have the same shape by using the same material and are formed into a three-dimensional shape, for example, a circular columnar shape or a rectangular columnar shape, having a contact end face coming into contact with the object to be measured 8 and a distal end face opposite to the contact end face. By using a material having relatively high thermal conductivity, for example, copper or aluminum, as the material, a thermophysical property of the object to be measured 8 can be measured. Other usable materials include aluminum alloy, stainless steel, etc.

The heating block unit 5 is made of a material having relatively high thermal conductivity, for example, copper or aluminum, and is made up of a metal block having an abutting end face abutting on the distal end face of the heating-side holding member 7, a heating element, for example, a ceramic heater or a cartridge heater, etc. The metal block has a function of diffusing heat to make temperature uniform, and a thermally conductive grease for reducing a contact thermal resistance is applied to a joint position with the heating element as needed. The heating element is connected to a heating block unit control device 18 for controlling an amount of heat generation.

The cooling block unit 6 is made of a material having relatively high thermal conductivity, for example, copper or aluminum, and has a metal block having an abutting end face abutting on the distal end face of the cooling-side holding member 9, a cooing element, for example, a water cooling unit, a Peltier element, or a combination of a heat sink and a cooling fan, etc. The metal block has a function of diffusing heat to make temperature uniform, and a thermally conductive grease for reducing a contact thermal resistance is applied to a joint position with the cooling element as needed. The cooling element is connected to a cooling block unit control device 19 for controlling an amount of heat discharge.

To reduce the contact thermal resistance, thermally conductive grease 10 is applied between the metal block of the heating block unit 5 and the heating-side holding member 7 as well as between the cooling-side holding member 9 and the metal block of the cooling block unit 6.

In such a configuration, the heat generated by the heating block unit 5 is transferred to the heating-side holding member 7, transferred through the object to be measured 8 to the cooling-side holding member 9, and discharged in the cooling block unit 6. When the heat passes through in a constant direction in this way, a temperature gradient is formed according to the thermal conductivity of the members and a difference in the contact thermal resistance between the members.

The side faces of the heating-side holding member 7 and the cooling-side holding member 9 have multiple holes formed along the longitudinal direction. Thermocouples 4 are inserted in the holes as temperature sensors and fixed such that temperature measurement points coincide with axes of the holding members 7, 9. These multiple thermocouples 4 enable measurement of temperature distribution corresponding to vertical positions, and the measured values thereof are input to a temperature measurement device 3, so that the temperature can constantly be monitored. From these measured values, an amount of heat passing through the object to be measured 8 can be calculated so as to calculate the thermophysical property value of the object to be measured 8 and the contact thermal resistance between the members. Such an arithmetic function may be built into the temperature measurement device 3 or may be built into an external computer connected through a network.

The cooling block unit 6 is disposed at the center of a base 17. Multiple (in FIG. 1, two) shafts 15 are vertically extended at end portions of the base 17. A support plate 12 is disposed above the base 17 so as to be vertically displaceable while being guided by the shaft 15. The heating block unit 5 is attached to the support plate 12. An upper plate 16 is fixed to upper ends of the shafts 15.

By providing the multiple shafts 15 as described above, vertical alignment can be ensured among the heating block unit 5, the heating-side holding member 7, the object to be measured 8, the cooling-side holding member 9, and the cooling block unit 6.

The thermal conductivity measurement apparatus 1 further includes a pressing force adjustment mechanism for adjusting a pressing force applied to the object to be measured 8 via the heating-side holding member 7 and the cooling-side holding member 9. The pressing force adjustment mechanism includes the support plate 12 disposed on an upper portion of the heating block unit 5 and supporting the heating block unit 5, a load cell 11 disposed on the support plate 12 for monitoring the pressing force, a spacer 13 disposed on the load cell 11 for transferring the pressing force to the load cell 11, the pressing force adjustment screw 14 fixed to the upper plate 16 for applying the pressing force via the spacer 13 to the load cell 11, etc. The pressing force measured by the load cell 11 is input to a measurement control device 2 so that the pressing force can constantly be monitored.

A technique of adjusting a pressing force will be described. When the thermophysical property of the object to be measured 8 is measured, the heat applied from the heating block unit 5 passes through the heating-side holding member 7, the object to be measured 8, and the cooling-side holding member 9 and reaches the cooling block unit 6. Due to the passing heat, the temperature rises in the members, i.e., the heating block unit 5, the heating-side holding member 7, the object to be measured 8, the cooling-side holding member 9, and the cooling block unit 6. As the temperature rises in the members, the members expand and the pressing force applied to the load cell 11 changes during measurement. Since the pressing force applied to the object to be measured 8 must be controlled to a constant force in the thermophysical property measurement of the object to be measured 8, it is necessary to adjust the pressing force adjustment screw 14 depending on a displayed pressing force. It is noted that the thermophysical property of the object to be measured can accurately be measured when variations from a predetermined pressing force are within ±5%, or preferably, variations from a predetermined pressing force are within ±1%. Therefore, the "constant pressing force" of the present invention means the variations from a predetermined pressing force within the range of ±5%, more preferably ±1%. Thus, it is preferable to provide a pressing force control apparatus adjusting the pressing force adjustment screw 14 through feedback of the pressing force applied to the load cell 11 so as to control the pressing force to a predetermined constant value. This enables elimination of manual work and automation of measurement. The support plate 12 and the spacer 13 are desirably made of sufficiently rigid metal.

Figure 2:
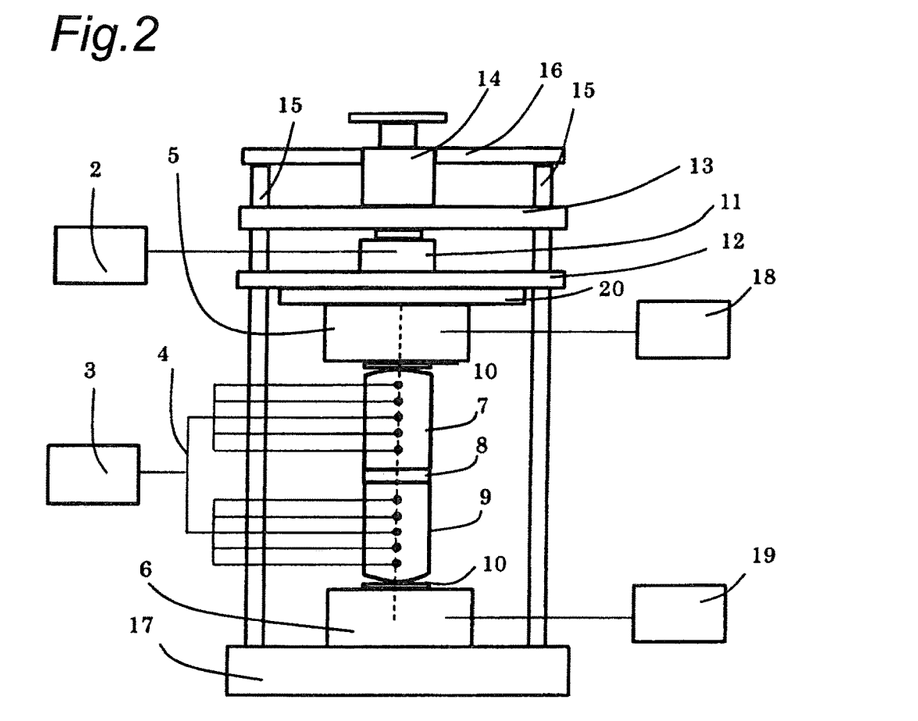
FIG. 2 is a configuration diagram of the thermal conductivity measurement apparatus according to the first embodiment of the present invention.

As shown in FIG. 2, a heat insulating plate 20 is preferably disposed between the heating block unit 5 and the support plate 12. An amount of heat transferred from the heating block unit 5 to the support plate 12 can consequently be reduced, so that the amount of heat transferred via the heating-side holding member 7 to the object to be measured 8 can be increased.

Figure 3:
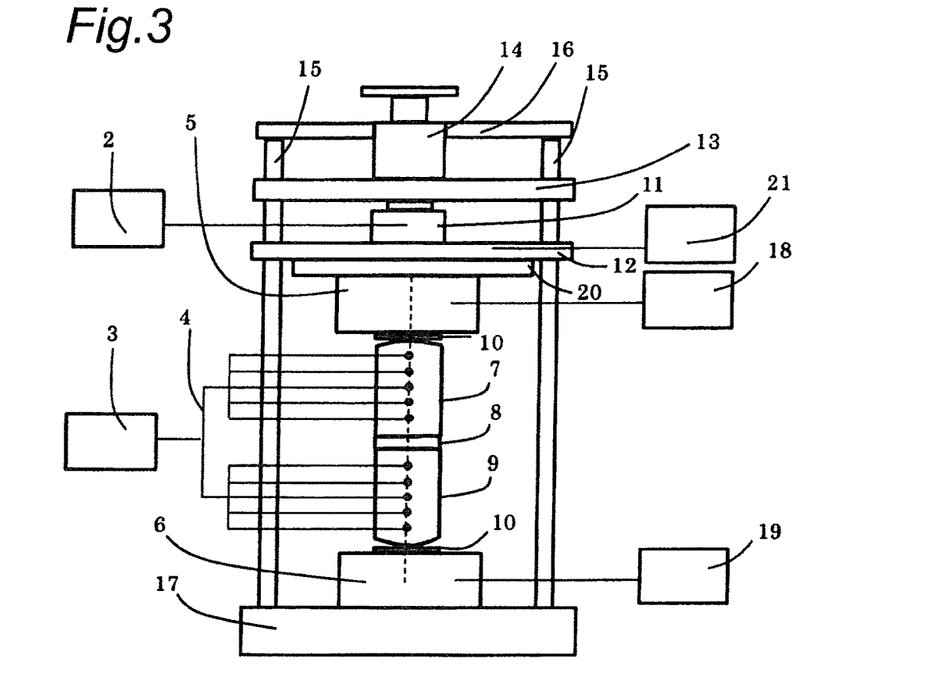
FIG. 3 is a configuration diagram of the thermal conductivity measurement apparatus according to the first embodiment of the present invention.

When the thermophysical property of the object to be measured 8 is measured, thickness information of the object to be measured 8 is also important. As shown in FIG. 3, a thickness display device 21 may be disposed that can display a total thickness of the heating-side holding member 7, the object to be measured 8, and the cooling-side holding member 9 in the measurement state. The thickness display device 21 can be made up of a laser range finder, an optical scale, a magnetic scale, etc. However, this is not a limitation as long as the thickness of the object to be measured 8 can be calculated by using a position and a mechanism without using the position shown in FIG. 3. By preliminarily measuring the thickness of the heating-side holding member 7 and the cooling-side holding member 9 with slide calipers, a micrometer, etc., the thickness of the object to be measured 8 can more precisely be calculated from the thickness displayed on the thickness display device 21.

The shape of the holding members will be described. The shape of the heating-side holding member 7 and the cooling-side holding member 9 is, for example, a circular columnar shape having a diameter of 10 mm to 30 mm and a height of 30 to 100 mm, so that the thermophysical property value of the object to be measured 8 and the contact thermal resistance between the members can precisely and accurately be measured. Even when the members have a rectangular columnar shape etc., the measurement can be performed with the same accuracy.

Returning to FIG. 1, the contact end faces of the heating-side holding member 7 and the cooling-side holding member 9 are processed into flat faces, and the processed faces having smaller surface roughness is more preferable. In experiments, the thermophysical property of the object to be measured was precisely be measured when the faces were finished to the arithmetic average roughness Ra=0.8 μm. However, the surface roughness is not limited to this value.

The object to be measured 8 is inserted and fixed between the contact end faces of the heating-side holding member 7 and the cooling-side holding member 9. When the object to be measured 8 is a fluid, the object is adjusted to a specified thickness by a dispenser and screen printing and is applied between the heating-side holding member 7 and the cooling-side holding member 9. The heating-side holding member 7 and the cooling-side holding member 9 may be fixed by the viscosity force or the adhesion force of the object to be measured 8 itself or may be fixed by using an auxiliary member such as an adhesive tape.

To reduce heat dissipation due to heat transfer from the surfaces of the heating-side holding member 7 and the cooling-side holding member 9 to the air, a heat insulating material may be wrapped around the holding members. When the thermophysical property of the object to be measured 8 is measured, the heating-side holding member 7 and the cooling-side holding member 9 with the object to be measured 8 sandwiched therebetween are integrally disposed on the cooling block unit 6 and then sandwiched between the heating block unit 5 and the cooling block unit 6. Furthermore, by tightening the pressing force adjustment screw 14 serving as the pressing force adjustment mechanism including the load cell 11, a constant pressing force is applied to the heating-side holding member 7, the object to be measured 8, and the cooling-side holding member 9, and the measurement of the thermophysical property is started in this state.

Furthermore, the distal end face of the heating-side holding member 7 coming into contact with the heating block unit 5 and the distal end face of the cooling-side holding member 9 coming into contact with the cooling block unit 6 are provided with a planar R shape (convex cylindrical face) or a spherical R shape (convex spherical face).

Figure 5:
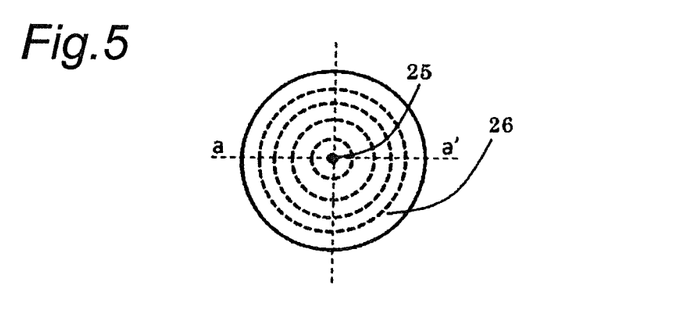
FIG. 5 is a graph of isotherms when the object to be measured and the holding members are not tilted.

Conventionally, these distal end faces are flat and, therefore, to precisely measure the thermophysical property of the object to be measured 8, when heat passes through the heating-side holding member 7, the object to be measured 8, and the cooling-side holding member 9, the heat must be allowed to pass through symmetrically about the axial center without bias, such that the temperature is distributed in an in-plane direction (a plane perpendicular to axes) of the heating-side holding member 7 and the cooling-side holding member 9 as shown in an isotherm graph of FIG. 5, and a temperature variation in the plane must be made as small as possible. In this graph, reference numeral 25 denotes a temperature measurement point of the thermocouple 4, and reference numeral 26 denotes an isotherm of a specific temperature.

To allow the heat to pass from the heating block unit 5 through the axial centers of the heating-side holding member 7, the object to be measured 8, the cooling-side holding member 9, and the cooling block unit 6, it is necessary to dispose the heating-side holding member 7, the object to be measured 8, and the cooling-side holding member 9 such that the axes of these three members coincide with each other, i.e., such that the axial centers of the heating-side holding member 7 and the cooling-side holding member 9 as well as the center axis of the object to be measured 8 are on a straight line.

However, as compared to the heating block unit 5 and the cooling block unit 6, the heating-side holding member 7 and the cooling-side holding member 9 are small. Therefore, when a pressing force is applied by adjusting the pressing force adjustment screw 14 to the members, i.e., the heating-side holding member 7, the object to be measured 8, and the cooling-side holding member 9, a deviation may occur among the axes of the three members, i.e., the heating-side holding member 7, the object to be measured 8, and the cooling-side holding member 9. Actually, considering the parallelism and flatness of the abutting end face of the heating member and the abutting end face of the cooling member manufactured by machining, surface treatment, etc., the axes of the three members, i.e., the heating-side holding member 7, the object to be measured 8, and the cooling-side holding member 9, are not on a straight line and are usually deviated to no small extent although magnitude may differ.

Figure 4A:
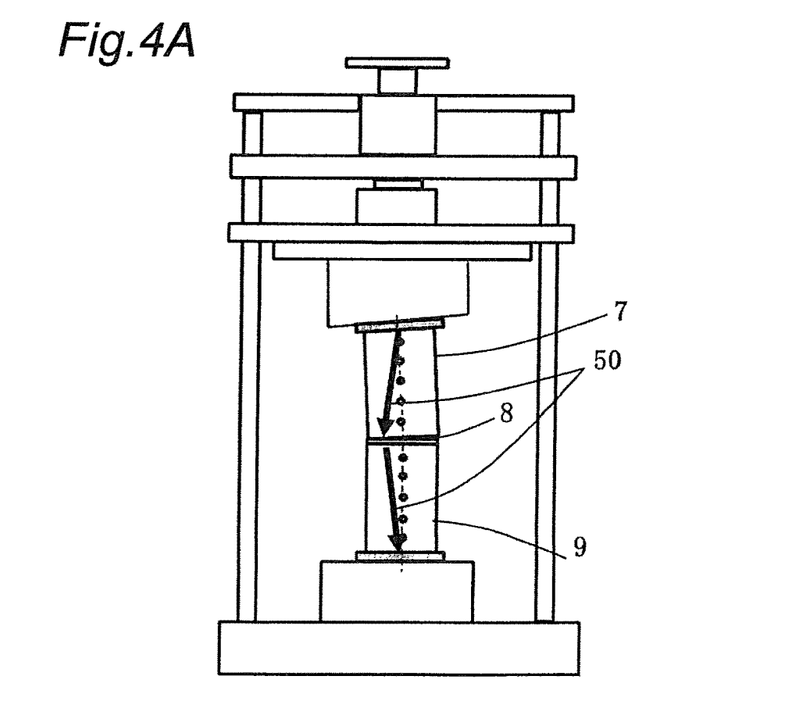
FIG. 4A is an explanatory diagram of a state in which a heating-side holding member is tilted since parallelism of a metal block of a heating block unit is not achieved.

FIG. 4A shows an example thereof in which the parallelism of the metal block of the heating block unit 5 is not achieved, i.e., the case in which the lower surface of the metal block is not horizontal. If a pressing force is applied when the parallelism of the metal block of the heating block unit 5 is not achieved, the distal end face of the heating-side holding member 7 follows the abutting end face of the metal block without the parallelism achieved, so that the abutting end face of the heating-side holding member 7 comes into partial contact with the object to be measured.

Figure 6:
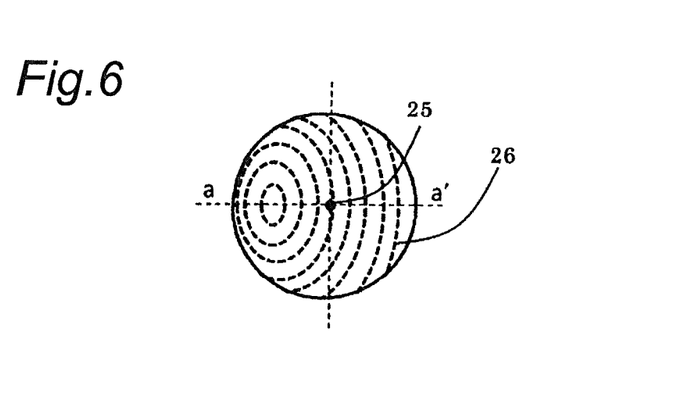
FIG. 6 is a graph of isotherms when the object to be measured and the holding members are tilted.

When the abutting end face of the heating-side holding member 7 comes into partial contact with the object to be measured 8 as shown in FIG. 4A, a thermal flux passing through the heating-side holding member 7, the object to be measured 8, and the cooling-side holding member 9 is not symmetric about the axial center and is biased toward one side as indicated by arrows 50. Consequently, as shown in FIG. 6, the heat passes through the heating-side holding member 7, the object to be measured 8, and the cooling-side holding member 9 while being biased from the center, which makes the temperature variation larger in the in-plane direction of the object to be measured 8, so that the thermophysical property of the object to be measured 8 cannot precisely be measured. Therefore, to precisely measure the thermophysical property of the object to be measured 8, it is necessary to perform confirmation and adjustment so that the parallelism is achieved in each of the heating block unit 5 coming into contact with the heating-side holding member 7 and the cooling block unit 6 coming into contact with the cooling-side holding member 9. In this case, skillful work is required, which tends to make a setting time and an adjustment time for measurement longer.

Alternatively, it is conceivable that a unit measuring a thermal bias in the members is added to make a correction corresponding to the measured thermal bias through calculation without the adjustment work. In this case, complicated calculations are required and the measurement accuracy may be reduced.

Figure 7A:
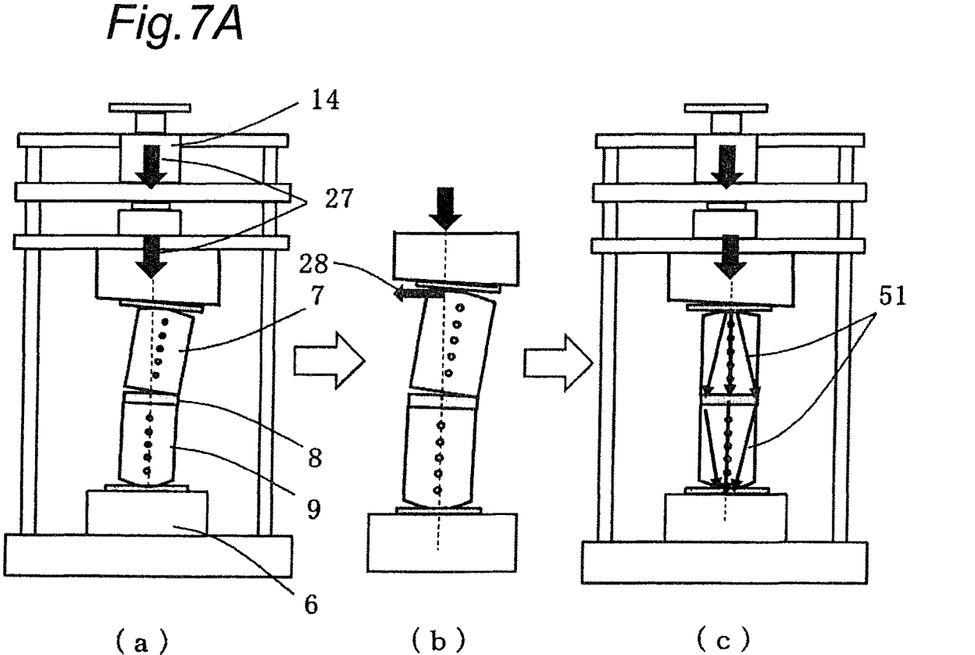
FIG. 7A is an explanatory diagram of an effect of the present invention when the heating-side holding member is tilted since the parallelism of the metal block of the heating block unit is not achieved.

FIG. 7A shows an example in which the present invention is applied when the parallelism of the abutting end face of the metal block of the heating block unit 5 is not achieved. As shown in FIG. 7A(a), since the parallelism of the abutting end face of the heating block unit 5 is not achieved in the initial stage of application of the pressing force, the heating-side holding member 7 is tilted, coming into partial contact with the object to be measured 8. In this case, the heat flux passing through the heating-side holding member 7, the object to be measured 8, and the cooling-side holding member 9 is biased and the temperature variation in the in-plane direction of the object to be measured 8 is large, so that the thermophysical property of the object to be measured 8 cannot precisely be measured. However, since the distal end faces of the heating-side holding member 7 and the cooling-side holding member 9 are provided with the planar R shape (convex cylindrical face) or the spherical R shape (convex spherical face) in the present invention, when the heating-side holding member 7, the object to be measured 8, and the cooling-side holding member 9 sandwiching the object to be measured 8 are sandwiched by the cooling block unit 6 and the heating block unit 5, and a pressing force is applied by the pressing force adjustment screw 14 to the heating block unit 5, the heating-side holding member 7, the object to be measured 8, the cooling-side holding member 9, and the cooling block unit 6, the heating-side holding member 7 and the cooling-side holding member 9 having the distal end faces provided with the planar R shape or the spherical R shape attempt to be in a stable posture, so that a motion following the surface of the heating block unit 5 naturally occurs (FIG. 7A(b)). Reference numeral 27 denotes a pressing force vector applied from the pressing force adjustment screw 14. Reference numeral 28 denotes a horizontal pressing force vector acting on the curved surface of the heating-side holding member 7 when the pressing force is applied.

Because of this motion, as shown in FIG. 7A(c), the axes of the three members, i.e., the heating-side holding member 7, the object to be measured 8, and the cooling-side holding member 9, can be made coincident with each other simply by applying the pressing force by the pressing force adjustment screw 14 without special adjustment, and the heat can pass axially symmetrically through the heating-side holding member 7, the object to be measured 8, and the cooling-side holding member (see FIG. 5), so that the temperature variation can significantly be reduced in the in-plane direction of the object to be measured 8. As a result, the thermophysical property of the object to be measured 8 can precisely and efficiently be measured without special adjustment.

To allow heat to pass from the heating block unit 5 through the axial centers of the heating-side holding member 7, the object to be measured 8, the cooling-side holding member 9, and the cooling block unit 6, it is preferable that the heating-side holding member 7, the object to be measured 8, and the cooling-side holding member 9 be disposed without a tilt relative to the axis of the entire measurement apparatus (the axis in the vertical direction).

Figure 4B:
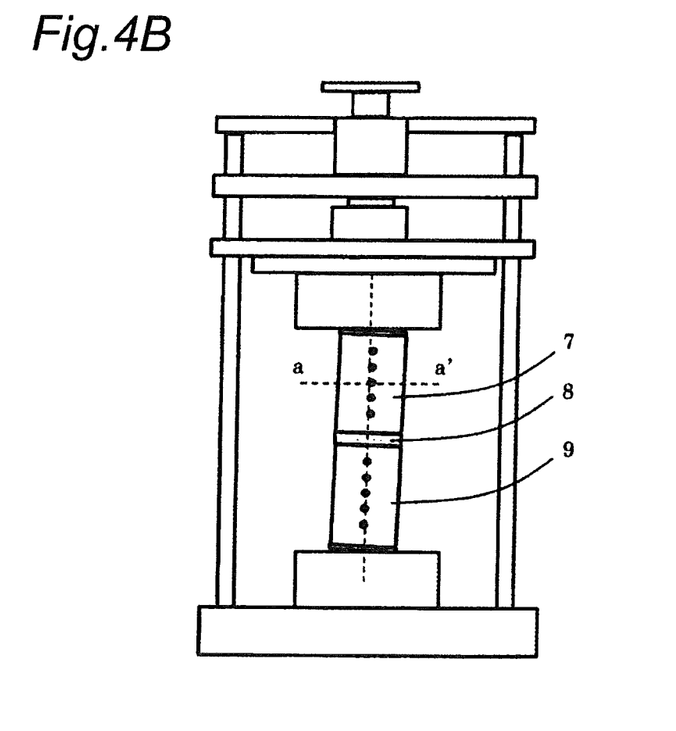
FIG. 4B is an explanatory diagram of a state in which an object to be measured and holding members are tilted.

However, as compared to the heating block unit 5 and the cooling block unit 6, the heating-side holding member 7 and the cooling-side holding member 9 are small. Therefore, as shown in FIG. 4B, when a pressing force is applied by adjusting the pressing force adjustment screw 14 to the members, i.e., the heating-side holding member 7, the object to be measured 8, and the cooling-side holding member 9, the members may be tilted relative to the axis of the apparatus main body.

When the members are tilted, as shown in FIG. 6, the heat passes through the heating-side holding member 7, the object to be measured 8, and the cooling-side holding member 9 while being biased from the center, and the thermophysical property of the object to be measured 8 cannot precisely be measured. Therefore, it is necessary to perform confirmation and adjustment so that the parallelism is achieved in each of the heating block unit 5 coming into contact with the heating-side holding member 7 and the cooling block unit 6 coming into contact with the cooling-side holding member 9. In this case, skillful work is required, which tends to make a setting time and an adjustment time for measurement longer.

Also in this case, alternatively, it is conceivable that a unit measuring a thermal bias in the members is added to make a correction corresponding to the measured thermal bias through calculation without the adjustment work; however, complicated calculations are required and the measurement accuracy may be reduced.

Figure 7B:
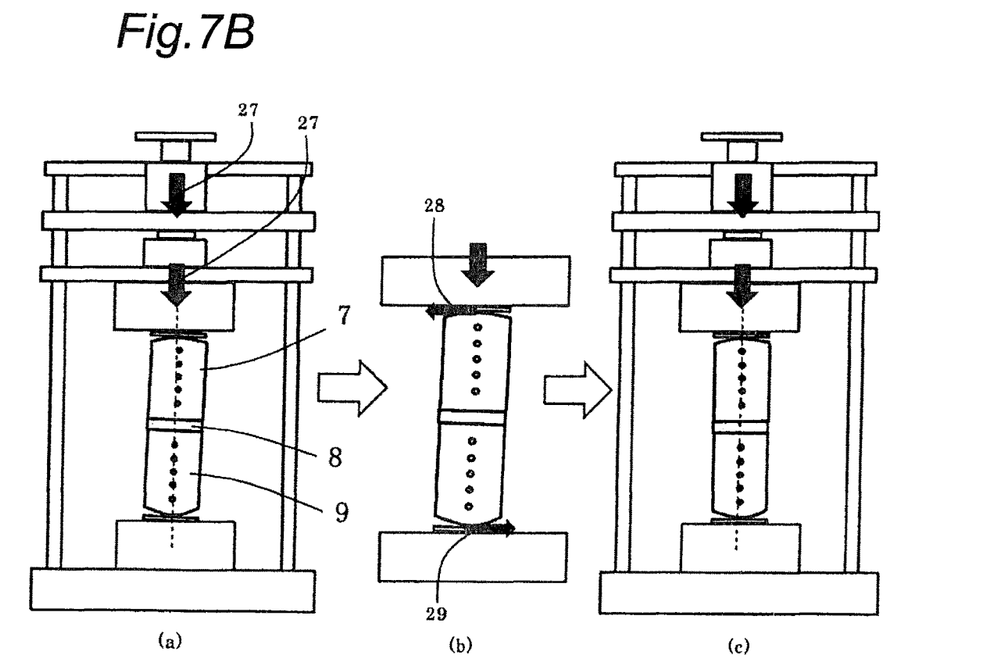
FIG. 7B is an explanatory diagram of an effect of the present invention when the object to be measured and the holding members are tilted.

In this embodiment, as shown in FIG. 7B(a), the abutting end faces of the heating block unit 5 and the cooling block unit 6 are formed into a planar shape and the distal end faces of the heating-side holding member 7 and the cooling-side holding member 9 are provided with the planar R shape (convex cylindrical face) or the spherical R shape (convex spherical face) so as to implement an automatic aligning mechanism. As a result, when the heating-side holding member 7, the object to be measured 8, and the cooling-side holding member 9 sandwiching the object to be measured 8 are sandwiched by the cooling block unit 6 and the heating block unit 5, and a pressing force is applied by the pressing force adjustment screw 14 to the heating block unit 5, the heating-side holding member 7, the object to be measured 8, the cooling-side holding member 9, and the cooling block unit 6, a motion following the surfaces of the heating block unit 5 and the cooling block unit 6 naturally occurs as shown in FIG. 7B(b) in the heating-side holding member 7, the object to be measured 8, and the cooling-side holding member 9 sandwiching the object to be measured 8 due to the planar R shape or the spherical R shape formed on the distal end faces of the heating-side holding member 7 and the cooling-side holding member 9. Reference numeral 27 denotes a pressing force vector applied from the pressing force adjustment screw 14. Reference numeral 28 denotes a horizontal pressing force vector acting on the curved surface of the heating-side holding member 7 when the pressing force is applied. Reference numeral 29 denotes a horizontal pressing force vector acting on the curved surface of the cooling-side holding member 9 when the pressing force is applied.

Because of this motion, as shown in FIG. 7B(c), the axes of the members, i.e., the heating-side holding member 7, the object to be measured 8, and the cooling-side holding member 9, can be aligned to the axis of the thermal conductivity measurement apparatus main body simply by applying a pressing force by the pressing force adjustment screw 14 without special adjustment. As a result, as shown in FIG. 5, the heat passes through the centers of the heating-side holding member 7, the object to be measured 8, and the cooling-side holding member 9 so that the thermophysical property of the object to be measured 8 can precisely be measured.

In this case, the distal end faces of the heating-side holding member 7 and the cooling-side holding member 9 are provided with the planar R shape (convex cylindrical face) or the spherical R shape (convex spherical face) so as to minimize the frictional force acting when the members attempt to be in a stable posture during application of the pressing force and to maximize the pressing force vector generated due to the pressing force. To ensure high measurement accuracy, it is desirable to increase the amount of heat passing through the heating-side holding member 7, the object to be measured 8, and the cooling-side holding member 9 to make the measurement temperature at the thermocouples higher, i.e., to make the temperature gradient greater. This is because the influence of the measurement temperature variation in the thermocouples (e.g., ±1.5° C. in the case of K thermocouples, Class 1) can be suppressed by increasing the amount of passing heat to make the measurement temperature at the thermocouples higher. If the amount of passing heat is small and the temperature gradient is small, this measurement temperature variation considerably affects the thermophysical property of the object to be measured. If the thickness of the heat conductive grease 10 (see FIG. 1) is thick, the thermal resistance of the thermally conductive grease becomes large, and the measurement temperature becomes low in the thermocouples of the heating-side holding member 7 and the cooling-side holding member 9, therefore causing a concern about deterioration in measurement accuracy. Thus, it is necessary to apply the heat conductive grease as thin as possible.

In experiments, when the holding members 7, 9 had a circular columnar shape of 15 mm in diameter and 30 mm in height and a convex spherical face with a curvature radius R was formed on the distal end faces, the thermophysical property values of the object to be measured 8 and the contact thermal resistance between the members were precisely measurable.

Figure 8:
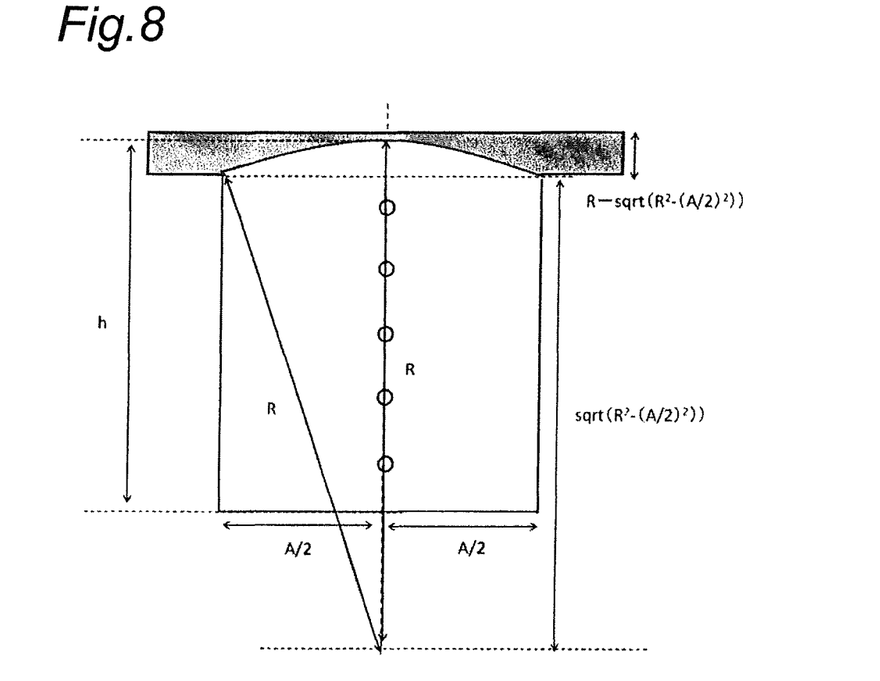
FIG. 8 is an explanatory diagram of a contact state between the holding member and an abutting end face of a heating member when the holding member has a diameter A and a distal end face provided with a curvature radius R.

Specifically, as shown in FIG. 8 showing a vertical cross section of the holding member, when the heating-side holding member 7 and the cooling-side holding member 9 had the diameter of A and the distal end faces with the curvature radius of R and the holding members 7, 9 had the configuration described above, the thermophysical property of the object to be measured 8 was precisely measurable if a size of a portion of the holding member following the heating block surface in the convex spherical shape, i.e., $R-\sqrt{R^2-(A/2)^2}$, is a size satisfying $0.01 \leq R-\sqrt{R^2-(A/2)^2} \leq 0.1$, more preferably,
$0.02 \leq R-\sqrt{R^2-(A/2)^2} \leq 0.05$.

The experiments were performed when the holding member had a shape of 15 mm in diameter, i.e., A=15 mm, for the respective convex, spherical shapes of R563 and R1406 (the radius R of 563 mm and 1406 mm).

R563 corresponds to $R-\sqrt{R^2-(A/2)^2}=0.02$, and
R1406 corresponds to $R-\sqrt{R^2-(A/2)^2}=0.05$.
However, the size of the curvature radius R is not limited thereto and can be changed as needed.

Figure 9:
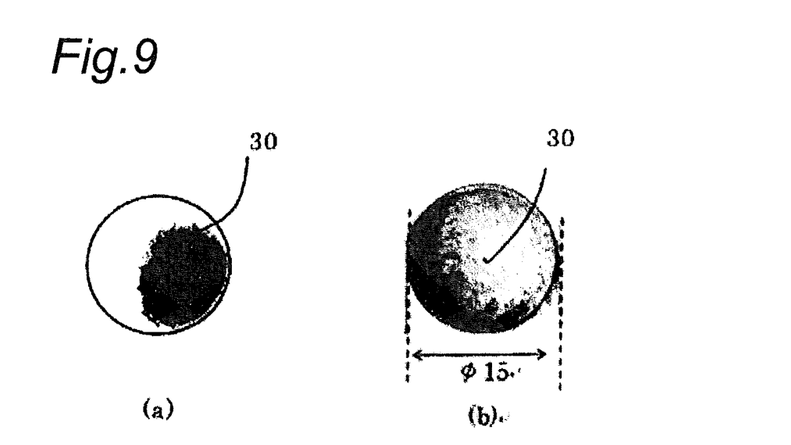
FIG. 9 is an explanatory diagram of a contact state on the distal end face of the holding member, showing both (a) partial contact and (b) full-face contact.

FIG. 9 shows results of confirmation of an effect on a contact state (e.g., pressure distribution) made by using a circular column of 15 mm in diameter and 30 mm in height when the distal end faces of the heating-side holding member 7 and the cooling-side holding member 9 are provided with the planar R shape or the spherical R shape. It can be seen that although partial contact occurs in a contact area 30 of the distal end face in FIG. 9(a) when the distal end face is flat, full-face contact occurs in the contact area 30 in FIG. 9 (b) when the distal end face is provided with the spherical R shape.

In the case described above, the object to be measured 8 is sandwiched between heating-side holding member 7 and the cooling-side holding member 9 to measure the thermophysical property value of the object to be measured 8. In addition to such a case, a large effect is produced on the measurement without the sandwiched object to be measured 8. Specifically, this is the case in which the pressing force and the contact thermal resistance between the members are calculated only from the heating-side holding member 7 and the cooling-side holding member 9 without sandwiching the object to be measured 8. When the contact thermal resistance is calculated, the contact state between the heating-side holding member 7 and the cooling-side holding member 9 greatly affects the measurement result. By forming the planar R shape or the spherical R shape on the distal end faces of the heating-side holding member 7 and the cooling-side holding member 9 as in the present invention, an ideal contact state of uniform contact between both members is acquired as shown in FIG. 9 without special adjustment. By measuring the contact thermal resistance in this state, the contact thermal resistance can efficiently and accurately be measured.

Although the thermally conductive grease is disposed between the abutting end face of the heating block unit 5 and the distal end face of the heating-side holding member 7 in the example shown in FIG. 1, the abutting end face of the heating block unit 5 is preferably provided with a grease recess capable of containing the top of the distal end face of the heating-side holding member 7, so as to prevent inconveniences such as the thermally conductive grease pushed out due to pressurization or flowing out due to an increase in fluidity caused by heating during measurement. Additionally, since the degree of freedom of the horizontal position of the holding member is restricted during the adjustment work, the positioning is advantageously made easier.

The thermally conductive grease is limited by a filler contained therein to have a certain thickness, has a thermal conductivity of about several W/mK, and therefore has a certain level of thermal resistance. However, since the heat flux is calculated in terms of the amount of heat passing through the object to be measured by using the multiple thermocouples shown in the figures in the present thermal conductivity measurement method, no influence of the thermal conduction grease appears in the measurement object. Therefore, highly accurate measurement can be performed.

In the example described above, a convex curved shape is applied to the distal end faces of both the heating-side holding member 7 and the cooling-side holding member 9; however, applying the convex curved shape to only one of the distal end faces causes no problem in accuracy.

In the example described above, the present invention is used for the measurement of thermal conductivity; however, the present invention is applicable to the measurement of thermal resistivity that is the reciprocal of thermal conductivity.

In the first embodiment of the present invention, for example, as shown in FIG. 1, the shafts 15 (two-shaft fixation using the two shafts 15 of FIG. 1) are used for ensuring the vertical alignment of the heating block unit 5, the heating-side holding member 7, the object to be measured 8, the cooling-side holding member 9, and the cooling block unit 6; however, the present invention is not limited to such a structure. In particular, by forming the planar R shape (convex cylindrical face) or the spherical R shape (convex spherical face) on the distal end faces of the heating-side holding member 7 and the cooling-side holding member 9 as in the present invention, the partial contact can be prevented and the full-face contact can be achieved between the heating-side holding member 7 and the object to be measured 8 as well as between the object to be measured 8 and the cooling-side holding member 9 even if the heating-side holding member 7, the object to be measured 8, and the cooling-side holding member 9 are tilted. Therefore, the thermophysical property of the object to be measured 8 can accurately be measured without using the multiple shafts 15 as in FIG. 1.

Figure 10:
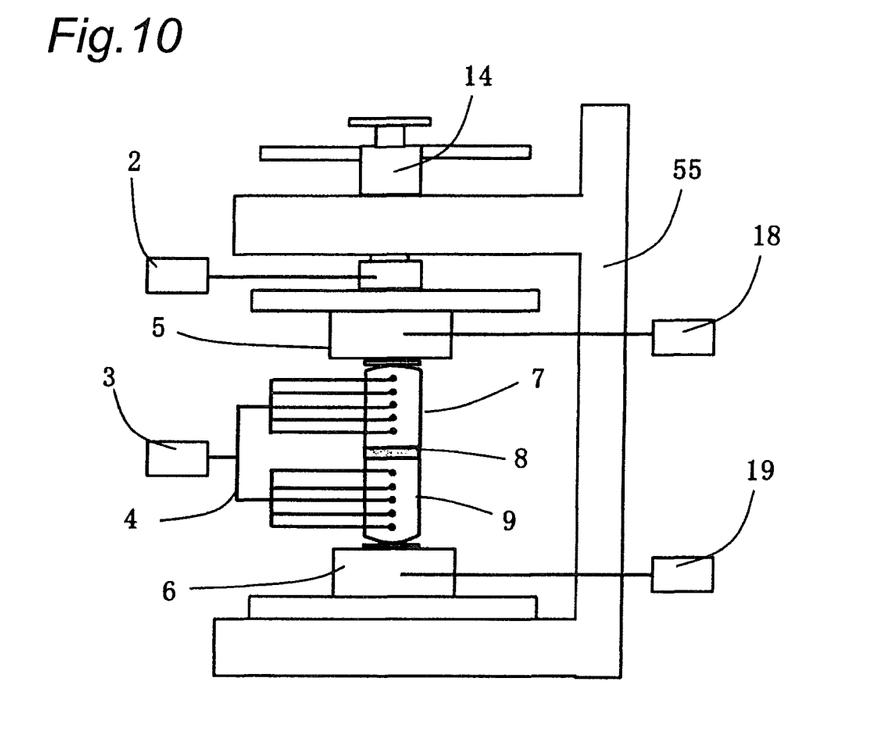
FIG. 10 is a configuration diagram of another thermal conductivity measurement apparatus according to the first embodiment of the present invention.

FIG. 10 is a configuration diagram of a single-shaft fixation measurement apparatus using a vise 55 and, in FIG. 10, the same reference numerals as FIG. 1 denote the same or corresponding portions. By using the present invention, the thermophysical property of the object to be measured 8 can accurately be measured even in the case of the single-shaft fixation using the vise 55 etc. as shown in FIG. 10.

Second Embodiment

Figure 11:
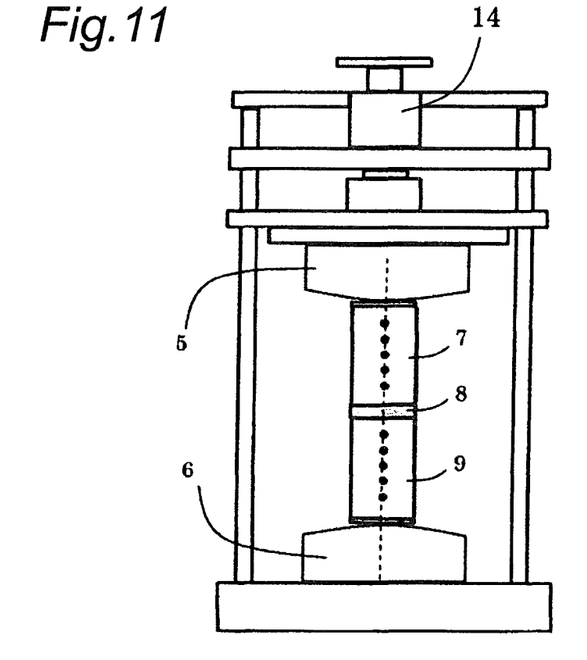
FIG. 11 is a configuration diagram of a thermal conductivity measurement apparatus according to a second embodiment of the present invention.

FIG. 11 is a configuration diagram of a thermal conductivity measurement apparatus according to a second embodiment of the present invention and, in FIG. 11, the same reference numerals as FIG. 1 denote the same or corresponding portions. In the thermal conductivity measurement apparatus according to the second embodiment, the distal end faces of the heating-side holding member 7 and the cooling-side holding member 9 as well as the abutting end faces of the heating block unit 5 and the cooling block unit 6 have shapes different from those of the thermal conductivity measurement apparatus of FIG. 1.

Specifically, the distal end faces of the heating-side holding member 7 and the cooling-side holding member 9 are formed into a planar shape, while the abutting end faces of the heating block unit 5 and the cooling block unit 6 are provided with a planar R shape (convex cylindrical face) or a spherical R shape (convex spherical face), so as to suppress the temperature variation in the in-plane direction of the object to be measured 8.

In the second embodiment, since the abutting end faces of the heating block unit 5 and the cooling block unit 6 are provided with the planar R shape (convex cylindrical face) or the spherical R shape (convex spherical face), when the heating-side holding member 7, the object to be measured 8, and the cooling-side holding member 9 sandwiching the object to be measured 8 are disposed on the cooling block unit 6, and a pressing force is applied by the pressing force adjustment screw 14, it is attempted by the heating-side holding member 7, the object to be measured 8, and the cooling-side holding member 9 to be in a stable posture. In other words, as in the case of FIG. 7B of the first embodiment, the pressing force vectors (28, 29 of FIG. 7B) naturally occur without special adjustment due to the planar R shape or the spherical R shape provided on the metal block surfaces. As a result, the heat passes axially symmetrically through the heating-side holding member 7, the object to be measured 8, and the cooling-side holding member 9 (FIG. 5), so that the temperature variation is reduced in the in-plane direction of the object to be measured 8. Therefore, the thermophysical property of the object to be measured 8 can precisely and efficiently be measured without special adjustment.

Figure 12:
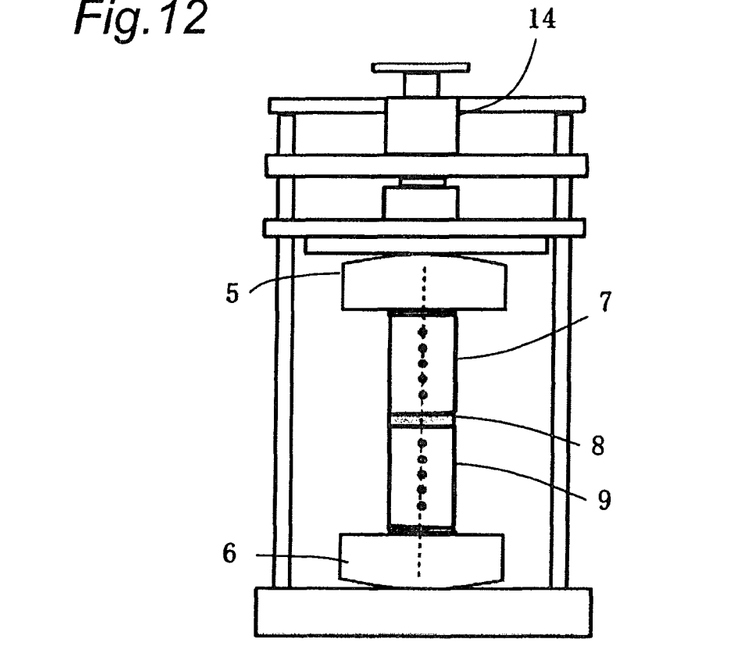
FIG. 12 is a configuration diagram of another thermal conductivity measurement apparatus according to the second embodiment of the present invention.

Also when the distal end face of the heating block unit 5 and the distal end face of the cooling block unit 6 are provided with the planar R shape (convex cylindrical face) or the spherical R shape (convex spherical face) as shown in FIG. 12, the axes of the heating-side holding member 7, the object to be measured 8, and the cooling-side holding member 9 can be made coincident with each other by applying the pressing force, so that the temperature variation in the in-plane direction of the object to be measured can maximally be suppressed. Therefore, the thermophysical property of the object to be measured can accurately and efficiently be measured.

When the abutting end faces of the heating block unit 5 and the cooling block unit 6 are provided with the planar R shape or the spherical R shape having a larger curvature radius R, the surface following effect is more effectively exerted.

The following (Table 1) shows a relationship of a combination of a convex curved shape and a planar shape with the surface following effect in terms of the distal end faces of the heating-side holding member 7 and the cooling-side holding member 9 as well as the abutting end faces of the heating block unit 5 and the cooling block unit 6. Conventionally, all the end faces have a planar shape (No. 1) and no surface following effect appears. In contrast, when at least one of all the end faces has the convex curved shape and the rest have the planar shape (Nos. 2 to 10), the surface following effect appears, and the surface following effect generally increases as the number of the end faces having the convex curved shape increases.

TABLE 1

| No. | abutting end face of heating block 5 | distal end face of heating-side holding member 7 | distal end face of cooling-side holding member 9 | abutting end face of cooling block 6 | surface following effect | measurement accuracy |
| --- | --- | --- | --- | --- | --- | --- |
| 1 | planar | planar | planar | planar | no | poor (X) |
| 2 | planar | convex curved | convex curved | planar | yes | very good (◎) |
| 3 | planar | planar | convex curved | planar | yes | good (○) |
| 4 | planar | convex curved | planar | planar | yes | good (○) |
| 5 | convex curved | planar | planar | convex curved | yes | good (○) |
| 6 | planar | planar | planar | convex curved | yes | good (○) |
| 7 | convex curved | planar | planar | planar | yes | good (○) |
| 8 | convex curved | convex curved | convex curved | convex curved | yes | very good (◎) |
| 9 | planar | planar | convex curved | convex curved | yes | good (○) |
| 10 | convex curved | convex curved | planar | planar | yes | good (○) |

Figure 13:
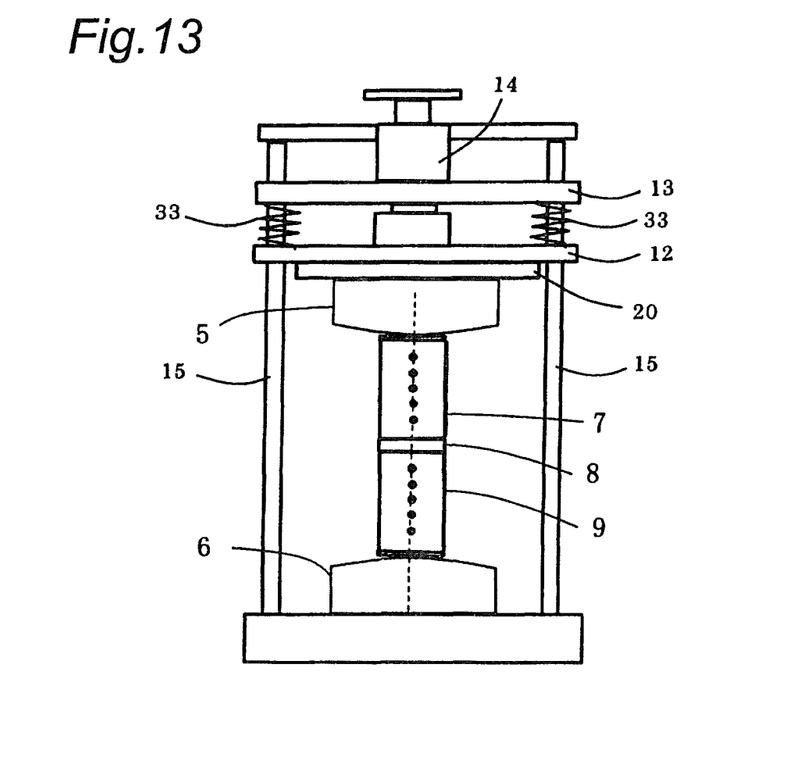
FIG. 13 is a configuration diagram of a thermal conductivity measurement apparatus on which coil springs are mounted.

As shown in FIG. 13, by mounting multiple coil springs 33 on the shafts 15 between the support plate 12 and the spacer 13, the pressing force can be applied to the heating block unit 5 while the support plate 12 and the spacer 13 are maintained parallel by a spring force. Therefore, the pressing force can be applied in an axially aligned state with respect to the heating-side holding member 7.

Figure 14:
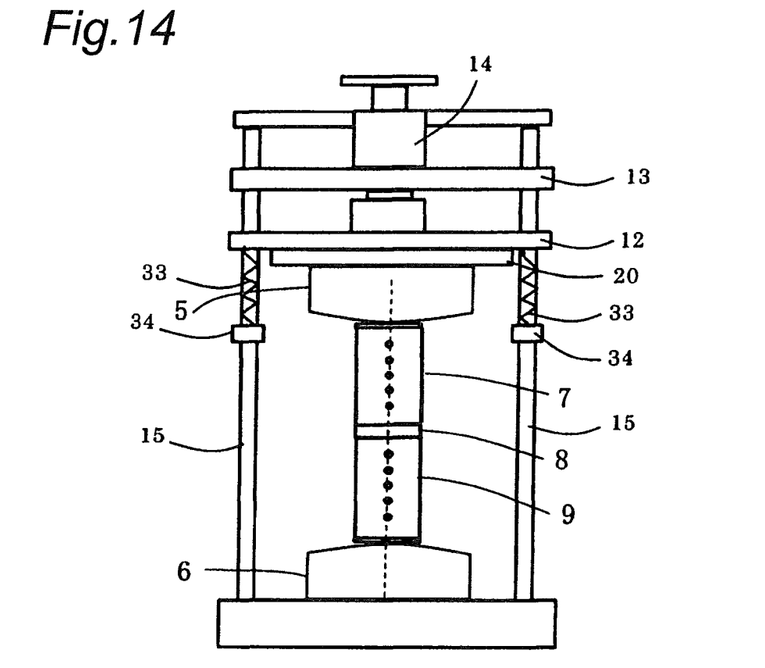
FIG. 14 is a configuration diagram of a thermal conductivity measurement apparatus on which spring receivers and the coil springs are mounted.

Alternatively, as shown in FIG. 14, by fixing spring receivers 34 to the shafts 15 under the support plate 12 and mounting the multiple coil springs 33 on the shafts 15 between the support plate 12 and the spring receivers 34, the pressing force can be applied in an axially aligned state with respect to the heating-side holding member 7.

At least one of the distal end face of the heating-side holding member 7, the distal end face of the cooling-side holding member 9, the abutting end face of the heating block unit 5, the distal end face of the heating block unit 5, the abutting end face of the cooling block unit 6, and the distal end face of the cooling block unit 6 may be formed into the convex curved shape (planar R shape or spherical R shape). Alternatively, at least one of the distal end face of the heating-side holding member 7, the abutting end face of the heating block unit 5, and the distal end face of the heating block unit 5 as well as at least one of the distal end face of the cooling-side holding member 9, the abutting end face of the cooling block unit 6, and the distal end face of the cooling block unit 6 may be formed into the convex curved shape (planar R shape or spherical R shape).

EXPLANATIONS OF LETTERS OR NUMERALS

1 thermal conductivity measurement apparatus; 2 measurement control device; 3 temperature measurement device; thermocouple; 5 heating block unit; 6 cooling block unit; heating-side holding member; 8 object to be measured; 9 cooling-side holding member; 10 heat conductive grease; 11 load cell; 12 support plate; 13 spacer; 14 pressing force adjustment screw; 15 shaft; 16 upper plate; 17 base; 18 heating block unit control device; 19 cooling block unit control device; 20 heat insulating plate; 21 thickness display device; 25 temperature measurement point; 26 isotherm; 27 to pressing force vector; 30 contact area; 33 coil spring; spring receiver; and 55 vise.

The invention claimed is:

1. A thermal conductivity measurement apparatus comprising:
   a first holding member having a contact end face coming into contact with an object to be measured and a distal end face disposed on the side opposite to the contact end face;
   a second holding member having a contact end face coming into contact with the object to be measured and a distal end face disposed on the side opposite to the contact end face, the second holding member holding the object to be measured together with the first holding member;
   a heating member having an abutting end face abutting on the distal end face of the first holding member and a distal end face disposed on the side opposite to the abutting end face, the heating member heating the first holding member;
   a cooling member having an abutting end face abutting on the distal end face of the second holding member and a distal end face disposed on the side opposite to the abutting end face, the cooling member cooling the second holding member;
   a plurality of temperature sensors disposed in the first holding member and the second holding member; and
   a pressing force application mechanism applying a pressing force to the first holding member, the second holding member, and the object to be measured, wherein
   at least one of the distal end face of the first holding member, the distal end face of the second holding member, the abutting end face of the heating member, the distal end face of the heating member, the abutting end face of the cooling member, and the distal end face of the cooling member has a convex curved shape.

2. The thermal conductivity measurement apparatus according to claim 1, wherein at least one of the distal end face of the first holding member, the abutting end face of the heating member, and the distal end face of the heating member as well as at least one of the distal end face of the second holding member, the abutting end face of the cooling member, and the distal end face of the cooling member have a convex curved shape.

3. The thermal conductivity measurement apparatus according to claim 1, wherein the distal end face of the first holding member, the distal end face of the second holding member, the abutting end face of the heating member, the distal end face of the heating member, the abutting end face of the cooling member, and the distal end face of the cooling member have a convex curved shape.

4. The thermal conductivity measurement apparatus according to claim 1, wherein the pressing force application mechanism adjusts a pressing force to a constant force during measurement.

5. The thermal conductivity measurement apparatus according to claim 1, comprising a base on which the cooling member is placed and a support plate placed on the heating member, wherein the support plate is supported by a shaft disposed on the base.

6. A thermal conductivity measurement method comprising the steps of:
   preparing the thermal conductivity measurement apparatus according to claim 1;
   sandwiching an object to be measured between the first holding member and the second holding member;
   applying an pressing force by the pressing force application mechanism to the first holding member, the second holding member, and the object to be measured; and
   measuring the thermal conductivity of the object to be measured with the plurality of temperature sensors.

7. A thermal conductivity measurement apparatus comprising:
   a first holding member having a contact end face coming into contact with an object to be measured and a distal end face disposed on the side opposite to the contact end face;
   a second holding member having a contact end face coming into contact with the object to be measured and a distal end face disposed on the side opposite to the contact end face, the second holding member holding the object to be measured together with the first holding member;
   a heating member having an abutting end face abutting on the distal end face of the first holding member, the heating member heating the first holding member;
   a cooling member having an abutting end face abutting on the distal end face of the second holding member, the cooling member cooling the second holding member;
   a plurality of temperature sensors disposed in the first holding member and the second holding member; and
   a pressing force application mechanism applying a pressing force to the first holding member, the second holding member, and the object to be measured, wherein
   at least one of the distal end face of the first holding member, the distal end face of the second holding member, the abutting end face of the heating member, and the abutting end face of the cooling member has a convex curved shape, and wherein each of the remaining end faces have a planar shape.

8. The thermal conductivity measurement apparatus according to claim 7, wherein at least two of the distal end face of the first holding member, the distal end face of the second holding member, the abutting end face of the heating member, and the abutting end face of the cooling member have a convex curved shape, and wherein each of the remaining end faces have a planar shape.

9. The thermal conductivity measurement apparatus according to claim 7, wherein all of the distal end face of the first holding member, the distal end face of the second holding member, the abutting end face of the heating member, and the abutting end face of the cooling member have a convex curved shape.

10. The thermal conductivity measurement apparatus according to claim 7, wherein the pressing force application mechanism adjusts a pressing force to a constant force during measurement.

11. The thermal conductivity measurement apparatus according to claim 7, comprising a base on which the cooling member is placed and a support plate placed on the heating member, wherein the support plate is supported by a shaft disposed on the base.

12. The thermal conductivity measurement apparatus according to claim 11, further comprising a heat insulating member interposed between the heating member and the support plate.

13. The thermal conductivity measurement apparatus according to claim 11, wherein the support plate is elastically supported by a plurality of coil springs.

\* \* \* \* \*